May 25, 1943.  H. E. BREY ET AL  2,320,320
TRACTION BRAKE AND DRIVING MECHANISM
Original Filed May 29, 1941  5 Sheets-Sheet 1
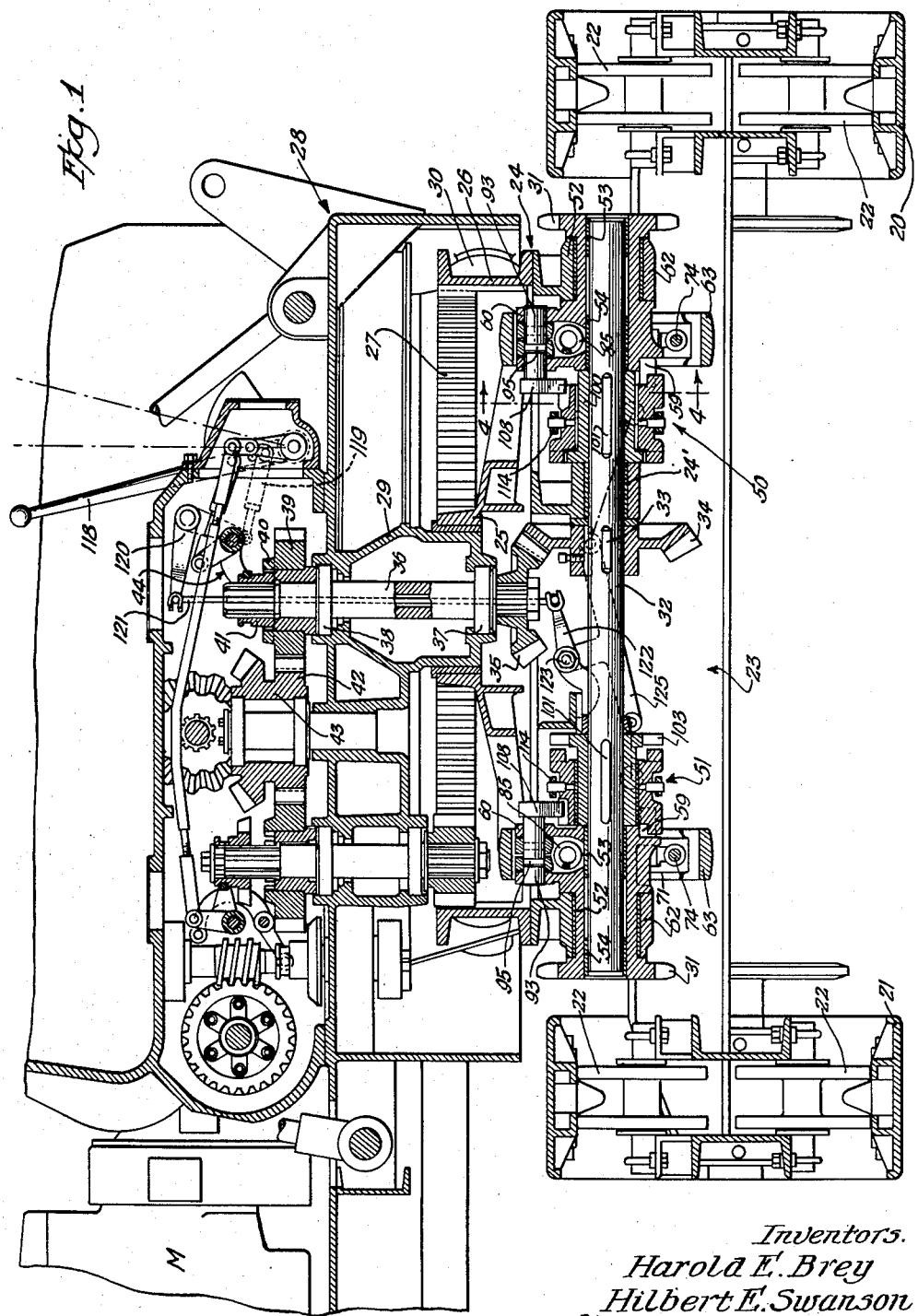
Inventors.
Harold E. Brey
Hilbert E. Swanson
By Charles B. Rasmussen
Atty.

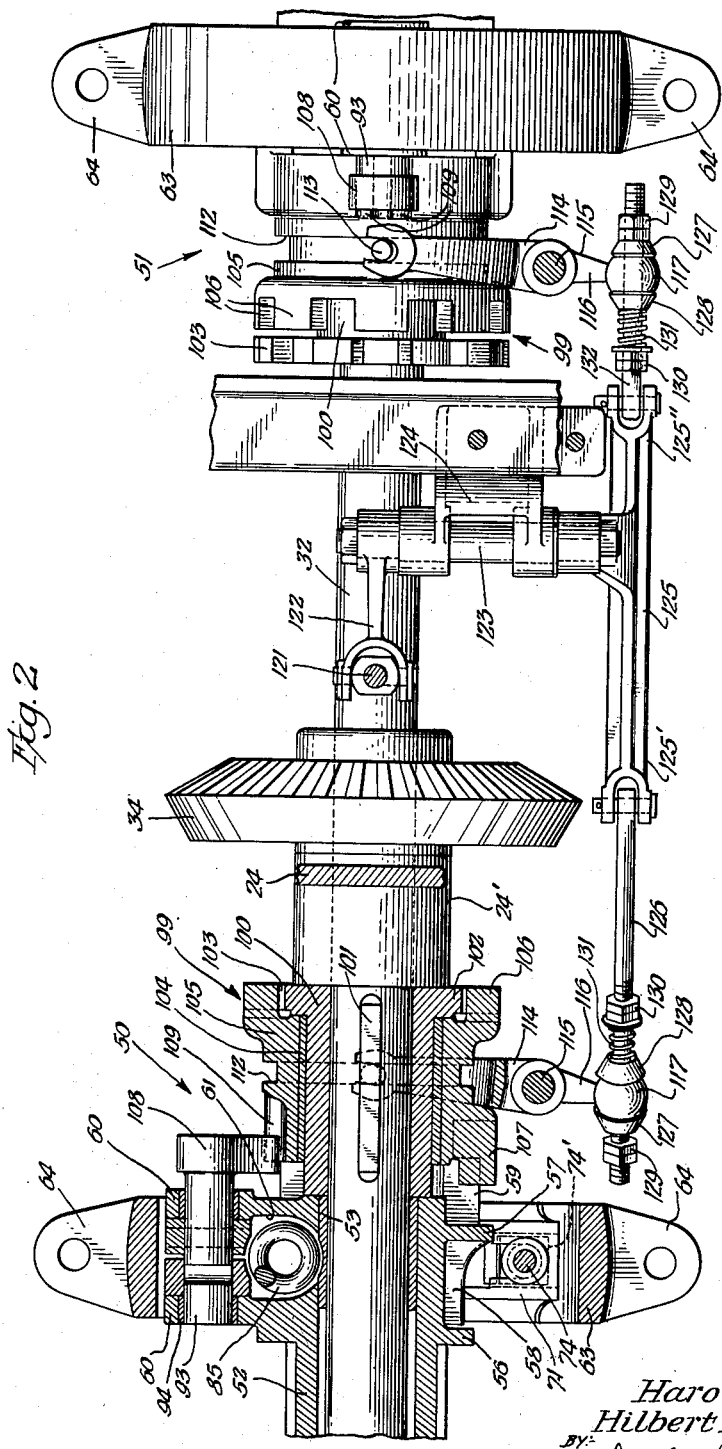

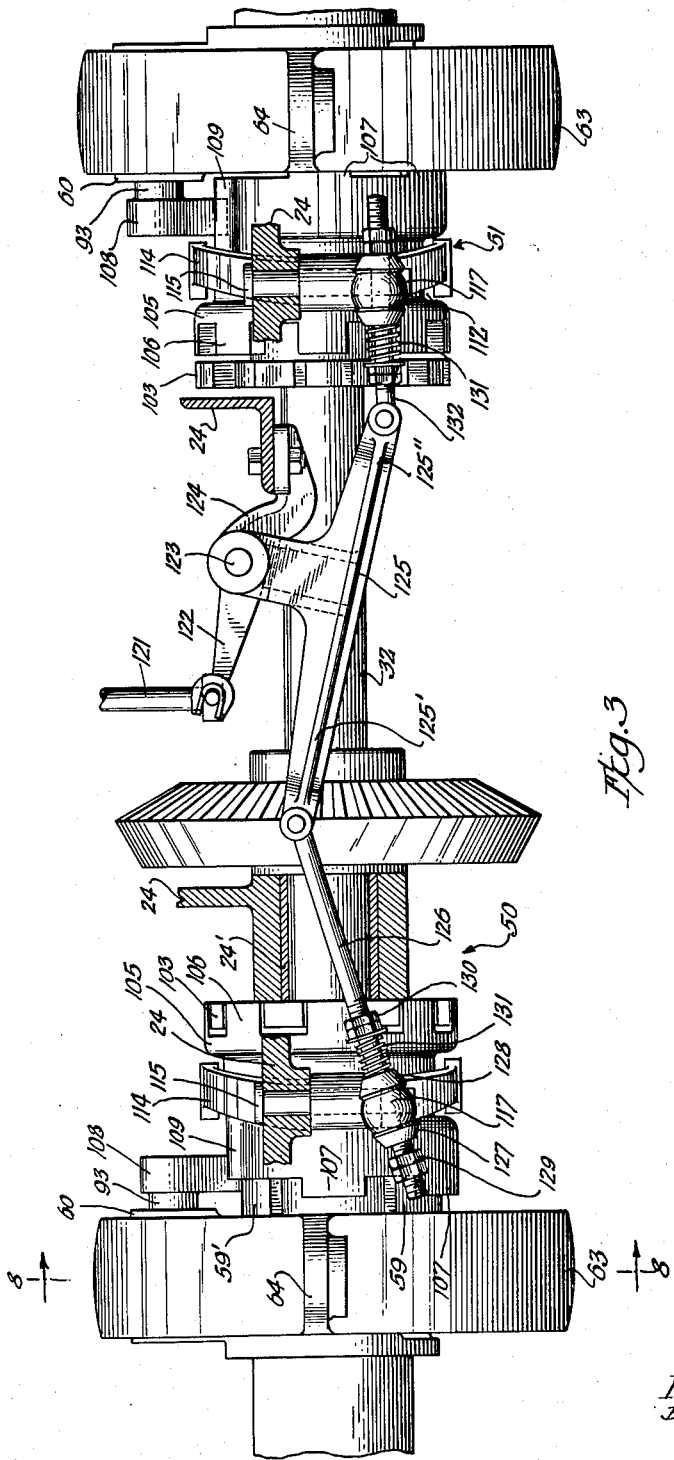

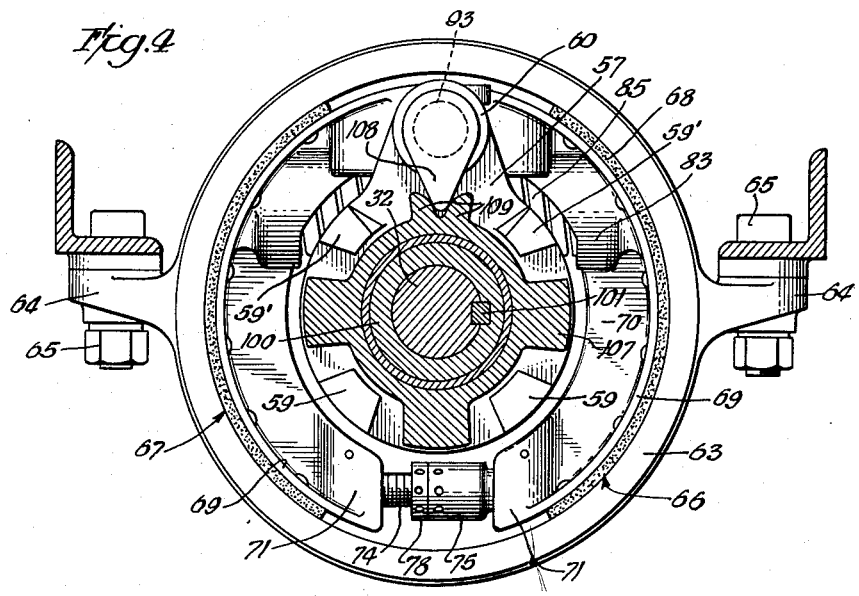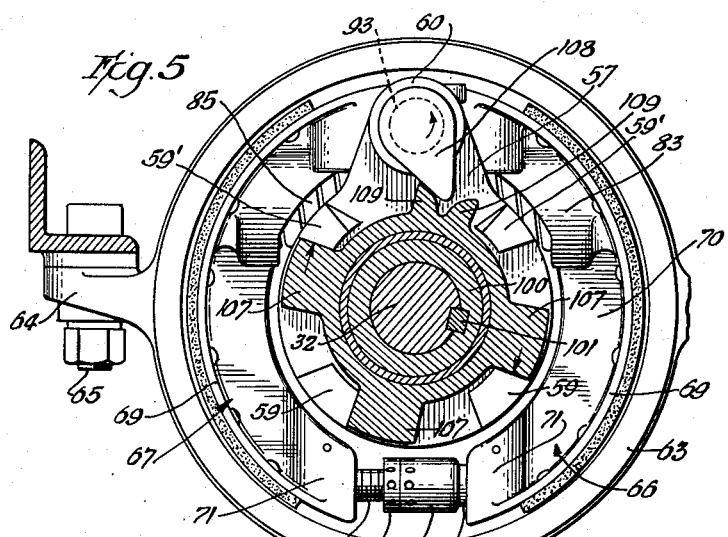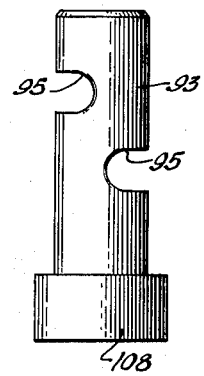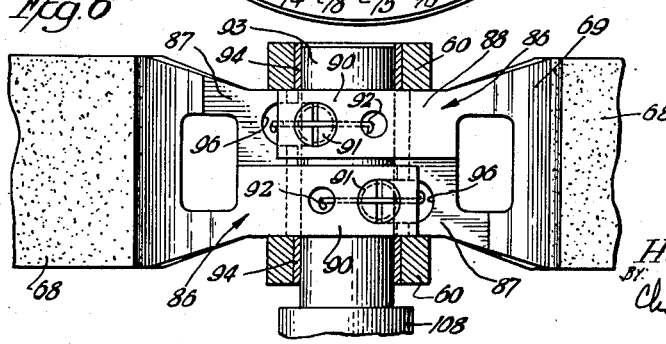

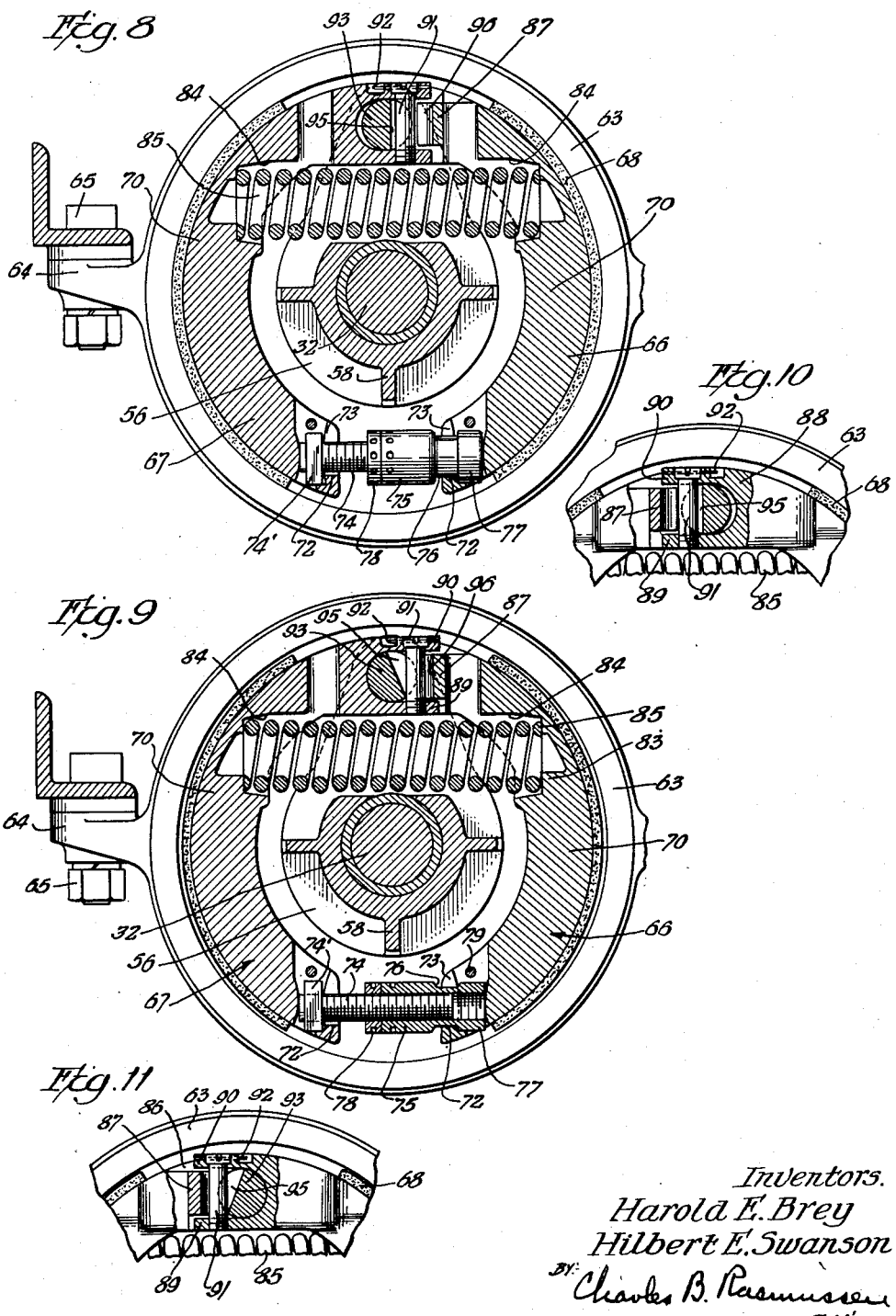

Patented May 25, 1943

2,320,320

UNITED STATES PATENT OFFICE 2,320,320

TRACTION BRAKE AND DRIVING MECHANISM

Harold E. Brey, Wauwatosa, and Hilbert E. Swanson, Milwaukee, Wis., assignors to Universal Unit Power Shovel Corporation, West Allis, Milwaukee, Wis., a corporation of Delaware Original application May 29, 1941, Serial No. 395,704. Divided and this application March 13, 1942, Serial No. 434,546

2 Claims. (Cl. 180—9.2)

This invention relates in general to improvements in traction brakes, and while it has more particular reference to a driving and braking mechanism, it will be apparent that certain features have other and more general and valuable application. The present invention is a division of our co-pending application Serial No. 395,704, filed May 29, 1941.

A principal object of the invention is the provision of a new and improved driving and braking mechanism.

An important object of the invention is the provision of a new and improved brake device particularly adapted for use in a combined driving and braking mechanism.

Another important object of the invention is the provision of an automatically operable brake device which serves as a positive friction type device locked or engaged under normal conditions.

A further important object of the invention is the provision of a brake device which is normally in engaged position and which automatically releases with the application of driving power to the element being braked.

Another object of the invention is the provision, in a mechanism having a pair of driving elements and a combined driving and braking unit for each element, of an automatically and independently operable brake for each unit of the mechanism, the brake being normally applied and released as an incident to the application of driving power to the unit.

A further object of the invention is the provision, in a mechanism having a pair of driving elements, of a normally applied and independently operable brake mechanism for each element and means for applying driving power to the elements simultaneously or separately, the brake mechanism automatically releasing the element upon the application of driving power.

A further object of the invention is the provision, in a machine having traction means of the caterpillar or crawler type, of a brake mechanism for each traction element which is normally applied and which automatically releases with the application of power to the traction element regardless of the direction in which the traction element is driven.

Numerous other objects and advantages of the invention will be apparent as it is understood from the following description, which, when taken in connection with the accompanying drawings, discloses a preferred embodiment thereof.

In the drawings,

Figure 1 is a transverse sectional view taken approximately at the center of a power shovel embodying the features of this invention;

Fig. 2 is an enlarged and fragmentary view, half in the bottom plan and half in diametrical section, of the driving mechanism for the traction means of the power shovel shown in Figure 1;

Figure 3 is a fragmentary view, with portions in section, of the traction means driving mechanism, drawn to the same scale as Fig. 2 and taken looking forward from the back of Fig. 1;

Fig. 4 is an enlarged transverse sectional view taken approximately along the line 4—4 of Fig. 1, showing the brake in applied position.

Fig. 5 is a view similar to Fig. 4, but showing the brake in released position;

Fig. 6 is an enlarged and partially sectional detailed view showing the actuating means for the brake shoes;

Fig. 7 is a detailed view of the brake actuating shaft;

Fig. 8 is a transverse sectional view taken approximately along the line 8—8 of Fig. 3 and showing the brake in applied position;

Fig. 9 is a view similar to Fig. 8, but showing the brake in released position;

Fig. 10 is a fragmentary transverse view taken along the line 10—10 of Fig. 3, and showing the brake in applied position; and Fig. 11 is a view similar to Fig. 10, showing the brake in released position.

It will be understood that while the invention is adaptable for use in a variety of machines, or vehicles, it is, for purposes of disclosure, shown in the drawings and hereinafter described in detail as embodied in the traction means of a power shovel. Generally, such a power shovel has a pair of crawlers or caterpillar treads 20 and 21 disposed one on each side of the shovel and each guided on a suitable track usually composed of rollers 22 journaled in a suitable frame, herein generally indicated at 23. Mounted upon the crawler frame 23 and preferably rigidly secured thereto, as by welding, is a frame 24 which is hereinafter termed the lower frame, which might be considered as completing the chassis of the power shovel. This lower frame includes a central hub 25 of substantial diameter, an annular channel shaped member 26 providing an outwardly opening roller track, and a large internal gear 27 integral with the channel member 26.

Mounted upon the lower frame 24 for rotation relative thereto is a rotating frame, generally indicated at 28, which forms the base of the shovel superstructure consisting of the boom, the cab, the motor M and the various gearings, clutches and control levers for operating the boom, drag line and the rotation of the rotating frame. These parts are all well-known construction and form no part of this invention and hence are not herein described in detail. Accordingly it would seem sufficient to point out that the rotating frame 28 has formed therein an elongated journal housing 29 which is journaled in the hub 25 to center the rotating frame, but which does not support the rotating frame, such support being obtained through rollers 30 carried by the frame and operating in the roller track formed by the member 26.

Each crawler is adapted to be driven independently by means including a drive element 31, in the form of a sprocket, from a drive shaft 32 extending transversely of the lower frame and journaled at 24' in the lower frame. Non-rotatably fixed on the shaft 32 intermediate the ends thereof, as by a key 33, is a bevel gear 34 meshing with a bevel gear 35 non-rotatably mounted on the lower end of a pintle 36 journaled at 37 and 38 in the journal housing 29 of the rotating frame. At its upper end the pintle 36 has rotatably mounted thereon a spur gear 39 having one face thereof formed with teeth or jaws 40 so as to constitute one element of a clutch, the complementary element 41 of which is splined to the pintle 36. The gear 39 meshes with the spur portion 42 of a compound gear 43 driven through suitable gearing by the motor M. Lever mechanism, generally indicated at 44, is operable to shift clutch element 41 longitudinally of the pintle for connection of the pintle with the motor.

In a variety of mechanisms to which this invention is applicable but particularly in traction means of the crawler type, provision must be made to drive both crawlers either forwardly or backwardly simultaneously, or to drive one crawler only in either direction while the other crawler is held stationary. To hold one of the crawlers stationary while the other crawler is operating, a variety of brake devices have been employed. These devices have, however, all proved unsatisfactory for a variety of reasons, but primarily because of the fact that their application or release required the attention of the operator of the power shovel. It is a feature of this invention to include in the driving mechanism for the crawlers automatically operable brake mechanism requiring no attention on the part of the operator. More particularly, brake mechanisms are provided which are normally engaged, thereby guarding against possible runaway of the shovel, the brake mechanisms being automatically released as an incident to application of power for driving the crawler.

Interposed operatively between the drive shaft 32 and one of the sprockets 31 is a braking and driving unit, generally indicated at 50, and operatively interposed between the drive shaft 32 and the other sprocket 31 is a similar braking and driving unit 51. These units are identical in construction, hence only one will be described. Each of the units comprises an elongated sleeve 52 rotatably mounted on an end of the shaft 32 on bushings 53 and 54. At its outer end the sleeve 52 has non-rotatably secured thereon, one of the sprockets 31, while at its inner end the sleeve is formed with a pair of axially spaced radially projecting flanges 56 and 57 extending partially around the sleeve and reinforced by webs 58 connected therebetween. Projecting axially inwardly from the face of the innermost flange 57 are a pair of clutch jaws or teeth 59 and a pair of jaws 59'. The jaws are spaced to provide three equal spaces therebetween each being considerably wider than even a full jaw or tooth 59.

Extending radially outwardly from this flanged end of the sleeve 52, so as to lie between the jaws 59' as viewed in Figs. 4 and 5, are a pair of ears 60 (see Fig. 6) disposed in planes transversely of the sleeve 52 and spaced axially. The sleeve is cut away at 61 radially inwardly of the ears 60, as best seen in Fig. 2, for a purpose which will presently become apparent. Intermediate the flange 56 and the splined end, the sleeve is somewhat reduced in external diameter and is journaled in a bearing 62 formed by the lower frame 24.

Disposed concentrally with the shaft 32 and sleeve 52 in the plane of the inner flanged end of the sleeve is an annular ring 63, the inner periphery of which constitutes a brake drum. This ring preferably is formed with outwardly projecting ears 64 diametrically disposed, by means of which the ring is rigidly secured to the lower frame 24 by means such as bolts 65. Cooperating with the ring 63 are a pair of brake shoes 66 and 67, each approximately semicircular and carrying the usual brake lining 68. The shoes are of identical construction, each having a band 69 and a radial reinforcing flange 70 to give the shoe intermediate its ends a generally T-shaped cross section. At one end, hereinafter termed the connected end, the flange 70 is expanded to produce a box-like structure 71 with an open top and bottom, and a front wall 72 having a slot 73 opening through the inner edge of the flange. Received in the box-like structure of the shoe 67, as shown in Figs. 8 or 9, is the head 74' of a bolt 74 with the bolt proper projecting through the slot 73. This bolt is threaded into an internally threaded sleeve 75 which has a reduced portion 76 spaced inwardly from one end to form a head 77 which is received in the box-like portion of the shoe 66, the reduced portion 76 lying in the slot 73. Also threaded on the bolt 74 is a lock nut 78 by means of which the sleeve and the bolt are locked in the desired position of adjustment. The inner face of each wall 72 and the wall opposite it are preferably made slightly convex, as best seen in Figs. 8 and 9, to provide bearing points for the shoes against the sleeve and the bolt. A pin 79 preferably extends across the top of each box-like structure to prevent the sleeve or bolt, as the case may be, from dropping out.

Near the opposite end the flange 70 is expanded into a cup-like portion 83 to provide a socket 84 (Figs. 8 and 9) for the reception of one end of a compression spring 85 extending transversely of the shaft 32 between the shoes 66 and 67. From the cup-shaped portion outwardly to the end, the flange continues in its expanded form but becomes solid while the band is narrowed to form a control head 86 (see Fig. 6) receivable between the ears 60. This head is divided centrally to provide a foreshortened portion 87 and an extending portion 88. The extending portion 88 takes the form of a yoke with an arm 89 and an arm 90 spaced radially outwardly of the arm 89. Extending through the arm 90 and threaded into the arm 89 is a bolt 91, which is preferably further secured by a cotter pin or wire 92. The foreshortened portion 87 also has a reduced radial dimension so as to be receivable between the arms 89 and 90 of the other shoe; it being readily apparent and as best seen from Fig. 6, that the heads 86 dovetail in the assembled position of the shoes.

With the brake shoes 66 and 67 urged apart and outwardly, by the compression spring 85, into engagement with the brake drum formed by the inner surface of the ring 63, the brake mechanism is normally applied unless disengaged or released by the actuation of means provided for that purpose. The brake releasing means shown herein comprises a shaft 93 journaled in the ears 60 and projecting through the yoked portions 88 of the control heads 86. Preferably interposed between the shaft and the ears are bushings 94. The shaft is formed (see Fig. 7) with a pair of parallel axially spaced, transverse and cord-like grooves 95 cut into the shaft on diametrically opposite sides. These grooves each receive therein one of the bolts 91. It will be apparent from Figs. 6 and 8 to 11 that, because of the extending portions 88, the bolts 91 will lie on that side of the shaft 93 opposite the shoe carrying the bolt. As best seen in Figs. 8 and 10, the grooves 95 in the shaft 93 are deep enough so that there is ample clearance, permitting the brake shoes to fully engage the ring 63. Likewise, there is ample clearance between the bolt and the bottom of the yoke of the extensions 88 to permit releasing or disengaging movements of the brake shoes. It will be clear that, with these clearances, and with the bolts 91 on the side of the shaft 93 opposite the shoe carrying them, rotation of the shaft 93 will through cam action cause separation of the bolts 91 and hence disengagement of the brake shoes from the ring 63. Such release of the brake occurs whether the shaft is rotated counter-clockwise, as shown in Fig. 9, or clockwise, as shown in Fig. 11. As the bolts 91 are separated, the heads 86 are drawn together, drawing the foreshortened portion 87 toward the extending portion 88 of the opposite shoe, and hence toward the bolt 91 carried by that extending portion. To accommodate the bolt, the foreshortened portion is formed with a radially extending groove 96.

Means are provided herein for driving the sleeve 52 and for releasing the brake mechanism with the application of power to the sleeve 52. This means comprises an elongated sleeve 100 non-rotatably mounted on the shaft 32 by suitable means such as a key 101. This sleeve forms one element of a clutch, generally indicated at 99, and to that end is formed with a radial flange 102 providing clutch jaws or teeth 103. Surrounding the sleeve 100 is a bushing 104, and both rotatable and axially slidable relative to the sleeve 100 is a sleeve 105 forming a compound shiftable clutch element. At its inner end, the sleeve 105 is formed with clutch jaws or teeth 106 for interengagement with the teeth 103 of the sleeve 100. At its other or outer end, the sleeve 105 is formed with three clutch-jaws or teeth 107 received between the teeth 59, 59' of the sleeve 52. The length of the jaws 59, 59' and 107 is such that they remain meshed in either position of the sleeve 105, that is, with the clutch 99 engaged or disengaged.

The jaws 107 are of approximately the same width as the jaws on the sleeve 52 and are thus considerably narrower than the spaces between the jaws of sleeve 52. Hence there is considerable lost motion between the sleeves 52 and 105 even though their jaws are meshed. This lost motion is utilized to release the brake prior to engagement of the jaws 107 with the jaws 59, so that at the time power is transmitted to the sleeve 52 the brake mechanism is disengaged and the sleeve 52 freed to rotate. To that end, the shaft 93 has secured on one end thereof a tapering arm or finger 108, while the sleeve 105 is opposite the intermediate one of the jaws 107 formed with a pair of lip-like teeth 109 between which the end of the finger 108 is received.

It is believed that it will be apparent from the foregoing that the action of the spring 85 will apply the brake mechanism, and that in so doing, it will through the bolts 91 rotate the shaft 93 to the position shown in Figs. 4, 8 and 10, which may be considered a normal or neutral position. Through the finger 108 the shaft will return the sleeve 105 to a normal or neutral position wherein the jaws 107 are positioned midway between adjacent jaws 59. Upon engagement of the jaws 103 and 106, and resultant rotation of the sleeve 105, the shaft 93 will first be rocked and thereby draw the brake shoes together to release the brake mechanism. By the time the jaws 107 engage the jaws 59, the brake mechanism will be fully released and the parts will be in the position shown in Figs. 5, 9 and 11. Figs. 5 and 9 show the position of the parts when the sleeve 105 is rotated in a clockwise direction, while Fig. 11 shows the parts in the position which they assume when the sleeve 105 is rotated in a counterclockwise direction, it being readily apparent, as previously pointed out, that the shaft 93 is operable to release the brake regardless of the direction in which it is rocked away from its neutral position.

To provide for engagement or disengagement of the sleeve 105 with the shaft 32, so that the crawler associated with the particular unit may be driven or held stationary, the sleeve 105 is formed with a groove 112 which is engaged by followers 113 carried by the arms of a shifting fork 114 rockably mounted on a pin 115 supported in a portion of the lower frame 24. Projecting in a direction opposite to the arms of the shifting fork is an arm 116 terminating in a spherical end 117 having the usual bore with flared ends passing therethrough.

The shifting forks 114 for the units 50 and 51 are connected to be simultaneously actuated by the operator through a single control lever. To that end, there is mounted in the cab a lever 118 which has a neutral position on either side of neutral. This lever is connected by a link 119 with one arm of a crank 120, the other arm of which is connected to a rod 121 extending axially through the pintle 36. At its lower end, the rod 121 is connected to an arm 122 which is rigid, as best seen in Figs 2 and 3, with one end of a stub shaft 123. This stub shaft is journaled in a bracket 124 secured to a portion of the lower frame 24, and at its other end has rigid therewith a triple armed crank 125. One arm 125' of this crank is connected to a rod or link 126 which is threaded at its free end and passes slidably through the spherical end 117 of one of the shifting forks 114. On opposite sides of the spherical end 117 the rod 126 carries slidably thereon cup-shaped washers 127 and 128, and also carriers two sets 129 and 130 of lock nuts. Interposed between the set 130 of nuts and the washer 128 is a compression spring 131. Connected to a second arm 125'' of the crank 125 is a rod 132 which, like the rod 126, is threaded and passes slidably through the spherical end 117 of the other shifting fork. The rod is connected to the shifting fork in the same manner as the rod 126, namely, through cup-shaped washers 127 and 128, sets of lock nuts 129 and 130, with a compression spring 131 again interposed between the washer 128 and the set 130 of lock nuts. The spacing of the sets of lock nuts coupled with the employment of the compression spring 131 which provides lost motion between the rods and the shifting forks, while at times tending to urge the sleeve 105 to engaged position, permits both the units 50 and 51 to be in driving engagement when the lever 118 is in neutral position, or permits one or the other unit to be in driving engagement while the other unit is disconnected.

It will be seen from the drawings and more particularly Figs. 2 and 3 thereof, that when the lever 118 is shifted to one side of its neutral position, the crank 125 is caused to be rocked in a clockwise direction, as viewed in Fig. 3, thereby causing the rod 126 through spring 131 and washer 128 to shift the sleeve 105 into engagement with the jaws 103. At the same time, the rod 132, through the washer 127 and set 129 of lock nuts, will shift the sleeve 105 of the unit 51 to disengaged position. Under these circumstances, the crawler driven from the unit 50 will be driven with the brake mechanism released through the action of the sleeve 105 on the shaft 93. The crawler driven from the unit 51, however, will be held stationary by the brake mechanism which is applied at all times when no driving force is being transmitted from the shaft 32 to the sprocket 31. Should the operator wish to have both crawlers operate simultaneously, the lever 118 is shifted to its neutral position, thereby rocking the crank 125 in a counterclockwise direction, as viewed in Fig. 3, from the position shown in Fig. 3. Such movement of the crank 125 is sufficient to cause engagement of the sleeve 105 of the unit 51 with the jaws 103, but is insufficient to disengage the unit 50. This is possible, because in the position shown in Fig. 3 there is a clearance between the set of nuts 129 on rod 126 and the spherical end 117 sufficient to permit of this rocking of the crank 125 to neutral position without actuating the shifting fork 114. If the lever 118 is now shifted beyond neutral in the same direction, the crank 125 is rocked further in a counterclockwise direction. With such movement, the nuts 129 will then cause disengagement of the unit 50 since the lost motion was taken up in the previous shift to neutral. The further axial movement of the rod 132 is permitted even though the sleeve 105 of the unit 51 was already in engagement with the teeth 103 by the compression of the spring 131.

It is believed that it will be apparent from the foregoing that a unique and most advantageous combined driving and braking mechanism, which has ready application in a variety of fields has been provided. More particularly, unique means have been provided for any mechanism having a pair of elements which are to drive simultaneously or separately while the other element is held stationary, for example, traction means of the crawler or caterpillar type. With the instant construction, each crawler is locked at all times, thereby preventing the machine from running away should there be some break in the driving mechanism. More important, however, the construction described provides for the automatic release of the brake mechanisms as an incident to the application of power. This relieves the operator of the necessity of manually releasing the brake mechanisms, making the machine equipped with this traction means more readily manipulated and, above all, prevents the injury which results from application of power without release of the brake mechanism, which occurs very frequently.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine having a pair of traction members, driving mechanism for the traction members comprising a common drive shaft, a pair of rotatable elements to be driven from said shaft and each connected to one of the traction members, a brake mechanism for each of said elements normally applied to hold the same against rotation, a shiftable member for each element in all positions having a driving engagement with the element and operable when driven to release said brake mechanism, a clutch formed in part by each member for coupling the member to said drive shaft, a shifting yoke for each member, and manually operable control means for said last mentioned members comprising a rockable crank, a first link connected at one end to said crank and having a lost motion connection with one of said yokes, and a second link connected at one end to said crank and having a lost motion connection with the other of said yokes whereby the control means is operable simultaneously or independently to engage said clutches.

2. In a machine having a pair of traction members, driving mechanism for the traction members comprising a common drive shaft, a pair of elements to be driven from said shaft and each connected with one of the traction members, a brake mechanism for each of said elements normally applied to hold the same against rotation, a shiftable member for each element in all positions having a driving engagement with the element and operable when driven to release said brake mechanism, a clutch formed in part by each member for coupling the member to said drive shaft, a shifting yoke for each member, and manually operable control means for said last mentioned members comprising a rockable crank, a first link connected at one end to said crank and having a lost motion connection with one of said yokes including yieldable means through which the member is urged toward clutch engaged position, and a second link connected at one end to said crank and having a lost motion connection with said other yoke including yieldable means for urging said member toward clutch engaged position, said control means in its neutral position causing both clutches to be engaged, and on either side of its neutral position causing one of the clutches to be disengaged while the other clutch remains engaged with the yieldable means flexing to permit the additional movement of the link.

HAROLD E. BREY.
HILBERT E. SWANSON.